(12) United States Patent
Himschoot et al.

(10) Patent No.: US 11,402,068 B2
(45) Date of Patent: Aug. 2, 2022

(54) COMPACT POWER PLANT

(71) Applicant: 247 ENERGY BVBA, Ostend (BE)

(72) Inventors: Peter Himschoot, Ostend (BE); James Troch, Ostend (BE); Karl Aerts, Ostend (BE); Kurt Ahrens, Ostend (BE)

(73) Assignee: 247 ENERGY BVBA, Ostend (BE)

( * ) Notice: Subject to any disclaimer, the term of this patent is extended or adjusted under 35 U.S.C. 154(b) by 0 days.

(21) Appl. No.: 16/762,365

(22) PCT Filed: Nov. 11, 2018

(86) PCT No.: PCT/EP2018/080847
§ 371 (c)(1),
(2) Date: May 7, 2020

(87) PCT Pub. No.: WO2019/092224
PCT Pub. Date: May 16, 2019

(65) Prior Publication Data
US 2020/0263567 A1    Aug. 20, 2020

(30) Foreign Application Priority Data
Nov. 10, 2017  (BE) .................................. 2017/0157

(51) Int. Cl.
*F17C 7/04* (2006.01)
*F01K 13/02* (2006.01)
(Continued)

(52) U.S. Cl.
CPC .................................. *F17C 7/04* (2013.01);
*B60P 3/00* (2013.01); *F01K 13/02* (2013.01);
*F01P 5/04* (2013.01);
(Continued)

(58) Field of Classification Search
CPC ........................... F02B 63/047; F02B 63/048;
F02B 2063/045; F02B 63/044;
F02B 63/04;
(Continued)

(56) References Cited
U.S. PATENT DOCUMENTS 5,375,580 A    12/1994 Stolz et al.
5,415,001 A    5/1995 Powars et al.
(Continued)

FOREIGN PATENT DOCUMENTS

CN        1805876 A    7/2006
CN      101754897 A    6/2010
(Continued)

OTHER PUBLICATIONS

International Search Report and Written Opinion from PCT Application No. PCT/EP2018/080847, dated Feb. 25, 2019.
(Continued)

*Primary Examiner* — John F Pettitt, III
(74) *Attorney, Agent, or Firm* — Workman Nydegger

(57) ABSTRACT

A power plant for energy production from a liquid gas product stored in a cryogenic storage tank, and comprises a container housing and an inlet to receive the gas product from the tank via a line. An evaporation unit converts the liquid gas product to a gaseous phase. The plant comprises an aggregate for the combustion of the gaseous phase to provide an electrical current to an external consumer. A circuit brings the liquid and/or gaseous phase to the motor via the evaporation unit. A regulating unit regulates the pressure and/or temperature. The liquid gas product is supplied to the motor in the gaseous phase by passive liquid and gas transport. A cooling circuit transfers heat from the motor to a heat exchanger in the evaporation unit.

12 Claims, 3 Drawing Sheets

(51) Int. Cl.
*B60P 3/00* (2006.01)
*F01P 5/04* (2006.01)
*F02B 63/04* (2006.01)
*H02J 1/00* (2006.01)
*F17C 7/02* (2006.01)

(52) U.S. Cl.
CPC ............ F02B 63/04 (2013.01); F02B 63/044 (2013.01); F17C 7/02 (2013.01); H02J 1/00 (2013.01); *F17C 2221/033* (2013.01); *F17C 2223/0161* (2013.01); *F17C 2223/033* (2013.01); *F17C 2225/0123* (2013.01); *F17C 2225/035* (2013.01); *F17C 2270/0581* (2013.01)

(58) Field of Classification Search
CPC ...... F17C 9/04; F17C 7/04; F17C 7/02; F17C 2265/07
USPC .................................................. 62/50.2, 50.1
See application file for complete search history.

(56) References Cited

U.S. PATENT DOCUMENTS

| | | |
|---|---|---|
| 5,457,951 A | 10/1995 | Johnson et al. |
| 6,047,747 A | 4/2000 | Bowen et al. |
| 6,899,146 B2 | 5/2005 | Bingham et al. |
| 7,222,647 B2 | 5/2007 | Bingham et al. |
| 2004/0250871 A1 | 12/2004 | Bingham et al. |
| 2005/0274126 A1* | 12/2005 | Baudat ...................... F17C 5/06 62/50.2 |
| 2006/0169352 A1 | 8/2006 | Bingham et al. |
| 2006/0185367 A1 | 8/2006 | Hino et al. |
| 2006/0201164 A1* | 9/2006 | Fickel ................... F02D 19/022 62/50.2 |
| 2008/0178611 A1* | 7/2008 | Ding ........................ F17C 9/04 62/50.2 |
| 2010/0060093 A1* | 3/2010 | Hunter .................... B60L 8/003 310/89 |
| 2011/0302923 A1 | 12/2011 | Hartono et al. |
| 2012/0240874 A1 | 9/2012 | Yoo et al. |
| 2014/0123916 A1* | 5/2014 | Coldren .................. F02B 43/10 123/3 |
| 2014/0299101 A1* | 10/2014 | Melanson .............. B60K 15/07 123/445 |
| 2016/0356424 A1 | 12/2016 | Lee et al. |
| 2017/0081972 A1 | 3/2017 | Park et al. |
| 2018/0123349 A1* | 5/2018 | Gleave .................. F02B 63/044 |

FOREIGN PATENT DOCUMENTS

| | | |
|---|---|---|
| CN | 201646314 U | 11/2010 |
| CN | 104853973 A | 8/2015 |
| WO | 2009011497 A2 | 1/2009 |

OTHER PUBLICATIONS

Search Report from corresponding application BE 201700157, dated Aug. 21, 2018.

\* cited by examiner

COMPACT POWER PLANT

TECHNICAL FIELD OF THE INVENTION

The present invention relates to the field of energy production by combustion of a gas, such as a methane-containing gas, for example natural gas or biogas. More particularly, the present invention relates to a compact power plant for energy production from a gas product stored in a removable cryogenic storage tank, and a corresponding method for energy production.

BACKGROUND OF THE INVENTION

It is an advantage of energy production from methane-containing gas products such as natural gas that, compared to other fossil fuels, a limited $CO_2$-emission can be achieved. For example, upon the combustion of 1 $m^3$ of natural gas, at 1 bar and 0° C., approximately only 1.8 kg of $CO_2$ is released.

Natural gas can be transported and/or stored as compressed natural gas (CNG) or as liquefied natural gas (LNG). While CNG is typically stored under high pressure, for example 200 bar or even higher, LNG can be stored at normal pressure, i.e. at approximately 1 bar, or at approximately atmospheric pressure, but at a cryogenic temperature, for example approximately −162° C. By so doing, the volume of a unit of LNG mass is about 600 times smaller than the gas under pressure, for example than CNG. Since the liquid gas is stored under normal pressure, safety risks associated with storage under high pressure are avoided. Liquefied natural gas, LNG, does not necessarily further refer to natural gas in liquid form only, but can also comprise a liquid gas gained from a sustainable source such as biogas. LNG may comprise, for example, a mixture of natural gas and biogas in liquid form.

SUMMARY OF THE INVENTION

Embodiments according to the present invention have the objective of providing good and efficient means and methods for providing energy.

It is an advantage of embodiments of the present invention that energy can be provided with a limited carbon footprint and/or with a low emission of carbon dioxide ($CO_2$), nitrogen oxide ($NO_x$), sulphur oxide ($SO_x$) and/or dust particles.

It is a further advantage that methane-containing gas products can be produced by a simple process, for example without involving a heavy carbon footprint burden upon production. It is a further advantage that methane-containing gas products do not require further chemical treatment for transport and/or storage. It is a further advantage that energy can be produced in an efficient manner from methane-containing gas products. It is a further advantage that combustion engines that produce energy from methane-containing gas products operate more quietly than comparable combustion engines that operate on traditional fuels such as diesel.

It is an advantage of embodiments of the present invention that liquefied natural gas can be transported efficiently by an advantageous high energy/volume density. Liquefied natural gas can further, for example, be supplied to about 3000 km away without significant loss in the form of boil-off gas (BOG).

It is an advantage of embodiments of the present invention that liquefied natural gas can be supplied without requiring a distribution network with pipelines.

It is an advantage of embodiments of the present invention that energy can be provided at a low cost.

It is an advantage of embodiments of the present invention that a power plant can be installed in a limited time, for example in a few hours.

It is an advantage of embodiments of the present invention that a power plant can be provided in a compact configuration, for example such that the required space can be restricted.

It is a further advantage that a good access control and security can be provided, for example that intentional and/or accidental disruptions by unauthorised persons can be avoided by providing the power plant in a compact and easily securable configuration.

It is an advantage of embodiments of the present invention that energy can be provided without a connection to a power distribution network.

It is an advantage of embodiments of the present invention that energy can be provided as an emergency power supply. It is a further advantage that a fast response time can be reached for starting up the emergency power supply in case of a power disruption of the distribution network.

It is an advantage of embodiments of the present invention that energy can be provided in a hybrid network in combination with inflexible and/or variable sources of renewable energy, such as a photovoltaic system and/or a wind power station. It is a further advantage that a drop of the power supplied from such sources of renewable energy can be quickly accommodated for by embodiments according to the present invention.

It is an advantage of embodiments of the present invention that residual heat in energy production can be efficiently used.

It is an advantage of embodiments of the present invention that maintenance and/or repair of a power plant can be provided by replacement of the power plant by a further identical power plant. It is a further advantage that as a result the time duration of an interruption in the energy production can be limited. It is a further advantage that a repair or maintenance can be implemented in a specialised maintenance centre.

It is an advantage of embodiments of the present invention that an efficiency of energy production can be reached of more than 45%, such as more than 65%, for example 80%.

The above-mentioned objective is accomplished by a device according to the present invention.

In a first aspect, the present invention relates to a power plant for energy production from a liquid gas product stored in a removable cryogenic storage tank. The power plant comprises a housing in the form of a container that is suitable to transport the power plant integrally as a transport unit. The power plant comprises a gas inlet, provided in or on the housing, to receive the liquid gas product via a line, e.g. a connecting line, e.g. a conduit, associated with the removable cryogenic storage tank. The power plant comprises an evaporation unit, in or on the housing, for converting the liquid gas product to a gaseous phase. The power plant comprises an aggregate, provided in the housing. The aggregate comprises a motor, e.g. an engine, for the combustion of the gaseous phase and an electrical generator coupled to the motor such that the electrical generator can be driven by the motor. The power plant comprises a line circuit, e.g. a conduit circuit, to transport the liquid gas product and/or the gaseous phase of the gas inlet to the motor via the evaporation unit. The power plant comprises a current output to supply an electrical current generated by the electrical generator to an external power consumer, e.g. an external electric power user. The power plant also comprises a regulating unit, e.g. a control device. The regulating unit is adapted to regulate, e.g. control, the pressure and/or temperature in the line circuit using at least one valve in the line circuit, such that the pressure of the gaseous phase supplied to the motor is regulated, e.g. controlled, in a predetermined range and the temperature of the gaseous phase amounts to at least 5° C. The gas inlet, the line circuit, the evaporation unit and the regulating unit are adapted to supply the liquid gas product, when this forced into the evaporation unit by an overpressure in the cryogenic storage tank via the gas inlet and the line circuit, to the motor in the gaseous phase by passive liquid and gas transport of the liquid gas product and the gaseous phase, for example without active liquid transport of the liquid gas product and without active gas transport of the gaseous phase.

The power plant comprises a cooling circuit, e.g. a water circuit, to withdraw heat, in operation, from the motor. The evaporation unit comprises a heat exchanger to transfer heat from the cooling circuit to the liquid gas product to evaporate the liquid gas product.

In the present description, passive liquid and/or gas transport refers to the use of passive pressure only, by an overpressure in the cryogenic storage tank and by pressure built up by the conversion of the liquid gas product in the gaseous phase, to force the liquid gas product and the gaseous phase forward in the line circuit. "Forward" refers here, substantially, to a transport from the gas inlet toward the motor.

In the present description, active liquid and/or gas transport refers to the use of driven transport means, for example mechanically and/or electrically driven transport means, such as e.g. pumps.

It is an advantage of embodiments of the present invention that the power plant can be easily started up while cold. It is an advantage of embodiments of the present invention that the power plant can easily be started up autonomously. For example, it is an advantage of embodiments that the passive liquid and gas transport allows the power plant to start without, or involving very limited electrical reserve energy to start, for example supplied by a battery with only a slight capacity.

In a power plant according to embodiments of the present invention, the at least one valve in the line circuit may comprise at least one first valve for regulating the pressure at an outlet thereof, e.g. being arranged to provide an output toward the aggregate, to be above a first predetermined value and/or to be below a second predetermined value. Thus, the at least first valve may comprise one or more valves to regulate the pressure of the gaseous phase supplied to the motor in the predetermined range. For example, suitable valves are known in the art that comprise an integrated pressure sensor or pilot to regulate an output pressure at a preset pressure and/or in a preset range. It is an advantage that such valves may be implemented, e.g. in a prior-art valve, by entirely mechanical means, e.g. without requiring an electrical power supply. For example, the at least one valve may comprise an active regulating valve, e.g. a diaphragm valve, as known in the art. For example, the at least one valve may comprise a safety shutdown valve, as known in the art. For example, the at least one valve may comprise an integrated sensor for monitoring the pressure or a pressure-sensitive mechanical coupling for controlling the valve action.

In a power plant according to embodiments of the present invention, the regulating unit may comprise at least one second valve for regulating the temperature of the gaseous phase, supplied to the motor, to amount to at least 5° C.

The at least one second valve may comprise an electric control mechanism, e.g. a temperature sensor, a controller and an electrically controlled valve actuator. However, the at least one second valve may comprise a passively controlled mechanism, e.g. a capillary temperature control valve as known in the art.

For example, the regulating unit may comprise a temperature sensor for measuring the temperature in the line circuit, e.g. at or near an outlet of the heat exchanger (i.e. of the gas circuit in the heat exchanger), and the at least one second valve may be provided in the cooling circuit, e.g. at or near in inlet of the heat exchanger (i.e. of the cooling circuit in the heat exchanger). The at least one second valve may be a controllable valve that is, in operation, controlled as function of an output signal of the temperature sensor. For example, the at least one second valve may be a three-way valve for regulating a cooling medium flow rate, e.g. a water flow rate, through the heat exchanger. Such three-way-valve may regulate the flow of warm cooling medium heated by the motor to the heat exchanger. For example, such three-way valve may be a three-port valve with mixing function. The three-way valve may comprise a piston valve. The three-way valve may comprise an autonomous temperature control system. For example, an outlet port of the valve for flow toward the heat exchanger may be (at least partially) closed in response to rising temperature of the gas measured by the temperature sensor, e.g. when above a predetermined threshold, embodiments of the present invention not being limited thereto (e.g. the closing of the valve may be defined by an increasing function as function of the temperature). The three-way valve may In a power plant according to embodiments of the present invention, the liquid gas product may comprise liquefied natural gas, stored in the removable cryogenic storage tank in the form of an ISO LNG container.

A power plant according to embodiments of the present invention may comprise the removable cryogenic storage tank and the line, where the gas inlet is connected to the removable cryogenic storage tank via the line.

In a power plant according to embodiments of the present invention, the housing can be provided in the form of an ISO intermodal freight container suitable for loading onto a standard freight vehicle.

In a power plant according to embodiments of the present invention, the gas inlet may be adapted to receive the liquid gas product at an overpressure of at least 1.0 barg.

In a power plant according to embodiments of the present invention, the aggregate may be adapted to supply an electrical power in the range of 250 kW to 5 MW.

A power plant according to embodiments of the present invention may comprise an access security, for example a mechanical security, such as a mechanical lock, and/or an electronic security, such as a monitoring system. The power plant may comprise an alarm system to report unauthorised access, for example physical and/or virtual access, to the power plant, for example using an electronic alarm signal, a visual alarm signal and/or an auditive alarm signal. The alarm system may comprise an emergency stop system to switch the power plant off upon detected unauthorised access.

A power plant according to embodiments of the present invention may comprise a coupling to connect an external heating and/or cooling circuit to the power plant, where the cooling circuit or another cooling (e.g. water) circuit is adapted to transfer heat to the external heating circuit and/or where the evaporation unit comprises a heat exchanger to cool a cooling medium in the external cooling circuit by heat transfer from the cooling medium to the liquid gas product.

In a power plant according to embodiments of the present invention, the line circuit may comprise an open passive system that does not comprise active, e.g. electrically and/or mechanically driven, liquid and/or gas transport means.

A power plant according to embodiments of the present invention may comprise a connection to couple a gas distribution network to the line circuit as alternative gas source.

A power plant according to embodiments of the present invention may be adapted to be switched in a hybrid energy network in combination with a photovoltaic system and/or wind energy plant.

In a power plant according to embodiments of the present invention, the regulating unit may be adapted to regulate, e.g. control, the temperature of the gaseous phase such that this at least amounts to 10° C. when supplied to the motor. The regulating unit may be adapted to regulate the temperature of the gaseous phase such that this amounts to a maximum of 50° C.

In a power plant according to embodiments of the present invention, the predetermined range of the pressure can be a range from 25 mbar to 100 mbar.

In a power plant according to embodiments of the present invention, the regulating unit may be adapted to regulate, e.g. control, the temperature of the cooling medium, e.g. water, in the cooling circuit such that this temperature lies in the range of 40° C. to 50° C. before the heat transfer to the liquid gas product in the evaporation unit.

In a power plant according to embodiments of the present invention, the evaporation unit may comprise an ambient heat exchanger to evaporate the liquid gas product by exposure to an ambient temperature, where the ambient heat exchanger is provided parallel to a primary heat exchanger to evaporate the liquid gas product using heat withdrawn from the cooling circuit.

A power plant according to embodiments of the present invention may comprise a buffer tank coupled to the line circuit.

A power plant according to embodiments of the present invention may comprise (e.g. the regulating unit may comprise) an electronic control device for processing signals of sensors, for driving actuators and/or for driving the aggregate.

In a power plant according to embodiments of the present invention, the electronic control device may comprise a communication module to monitor and/or drive the power plant via a communication connection, such as a digital communication network and/or a radio signal.

A power plant according to embodiments of the present invention may comprise a battery to provide a power supply to the control device of the power plant when the aggregate does not supply electrical power.

In a power plant according to embodiments of the present invention, the housing may comprise a self-lifting device to hoist the housing autonomously off and/or onto a freight vehicle. It is an advantage of embodiments of the present invention that the power plant can be set up in a remote area without external hoisting gear, such as a lifting crane, an adapted forklift hoist, a mobile hoist and/or a freight vehicle with dedicated modifications for autonomously loading and/or unloading the housing. The self-lifting device can form an integral part of the housing.

The self-lifting device can, for example, comprise a plurality of folding and/or extendable support elements to the support housing above the ground. The support elements may comprise lifting jack elements to jack the housing up and down. The support elements can be manually driven and/or be driven by the power plant, for example by the motor, the generator and/or a battery of the power plant.

A power plant according to embodiments of the present invention may be adapted to operate under a variety of extreme weather conditions, such as in both an environment characterised by extreme cold as well as in an environment characterised by extreme heat.

In a second aspect, the present invention provides a method for energy production from a liquid gas product stored in a removable cryogenic storage tank. The method comprises supplying a power plant according to embodiments of the first aspect of the present invention to a site by integrally transporting the power plant as a transport unit to the site. The method comprises supplying a removable cryogenic storage tank filled with the liquid gas product to the site. The method comprises connecting the removable cryogenic storage tank via a line to the gas inlet of the power plant. The method comprises evaporating, in the evaporation unit, the liquid gas product that is forced into the evaporation unit by an overpressure in the cryogenic storage tank via the gas inlet and the line circuit, such that a gaseous phase of the liquid gas product is formed.

The method comprises the combustion of the gaseous phase to drive the motor, and the generation of an electrical current by the electrical generator coupled to the motor. The method comprises supplying the electrical current via the current output to an external power consumer.

The pressure and/or temperature in the line circuit is regulated, e.g. controlled, in a predetermined range, such that the temperature of the gaseous phase amounts to at least 5° C. The liquid gas product in the gaseous phase is here supplied to the motor by passive liquid and gas transport of the liquid gas product and the gaseous phase.

The method may comprise the withdrawal of heat from the motor by a cooling circuit, e.g. water circuit, and may comprise the transmission of heat from the cooling circuit to the liquid gas product to evaporate the liquid gas product in the evaporation unit.

Particular and preferred aspects of the invention are set out in the accompanying independent and dependent claims. Features from the dependent claims may be combined with features of the independent claims and with features of other dependent claims as appropriate and not merely as explicitly set out in the claims.

Figure 1:
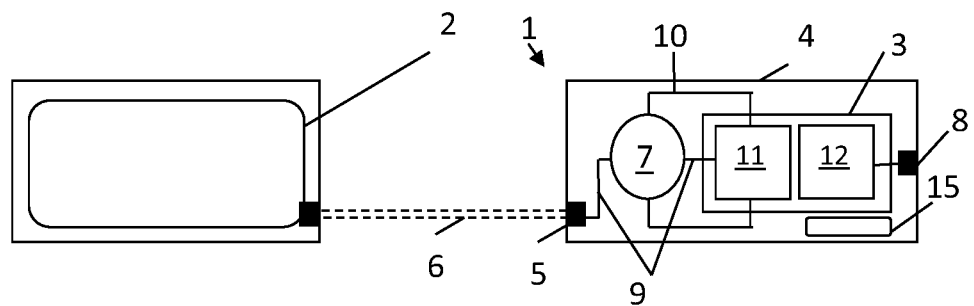
FIG. 1 shows a schematic representation of an exemplary power plant according to embodiments of the present invention.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF EMBODIMENTS

The present invention will be described with respect to particular embodiments and with reference to certain drawings but the invention is not limited thereto but only by the claims.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, above, front and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention provides a power plant for energy production from a liquid gas product stored in a removable cryogenic storage tank. The power plant comprises a housing in the form of a container that is suitable for transporting the power plant integrally as a transport unit. The power plant comprises a gas inlet, provided in or on the housing, to receive the liquid gas product via a line connected to the removable cryogenic storage tank. The power plant comprises an evaporation unit, in or on the housing, for converting the liquid gas product to a gaseous phase. The power plant comprises an aggregate, provided in the housing. The aggregate comprises a motor for the combustion of the gaseous phase and an electrical generator coupled to the motor such that the electrical generator can be driven by the motor. The power plant comprises a line circuit to bring the liquid gas product and/or the gaseous phase of the gas inlet to the motor via the evaporation unit. The power plant comprises a current output to supply an electrical current generated by the electrical generator to an external power consumer. The power plant also comprises a regulating unit. The regulating unit is adapted to regulate, e.g. control, the pressure and/or temperature in the line circuit using at least one valve in the line circuit, such that the pressure of the gaseous phase supplied to the motor is regulated, e.g. controlled, in a predetermined range and the temperature of the gaseous phase amounts to at least 5° C. The gas inlet, the line circuit, the evaporation unit and the regulating unit are adapted to supply the liquid gas product, when this forced into the evaporation unit via the gas inlet and the line circuit by an overpressure in the cryogenic storage tank, to the motor in the gaseous phase by passive liquid and gas transport of the liquid gas product and the gaseous phase, for example without active liquid transport of the liquid gas product and without active gas transport of the gaseous phase.

FIG. 1 shows a schematic representation of a power plant 1 according to embodiments of the present invention for energy production from a liquid gas product stored in a removable cryogenic storage tank 2.

Figure 2:
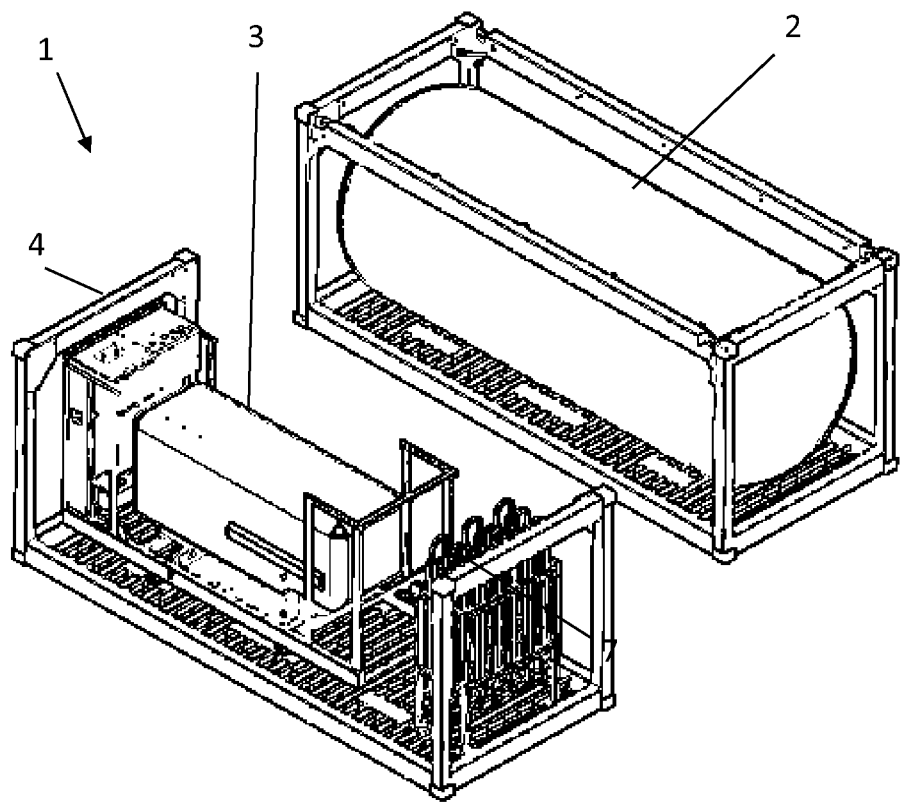
FIG. 2 represents a build-up of a power plant and a removable cryogenic gas storage tank according to embodiments of the present invention in two individually transportable units.

The liquid gas product may comprise liquefied natural gas, stored in the removable cryogenic storage tank. The cryogenic storage tank 2 may, for example, comprise an ISO LNG container, for example such as schematically illustrated in FIG. 2. Removable cryogenic storage tanks are known in the art. For example, U.S. Pat. No. 6,047,747 discloses a container for the distribution of liquefied natural gas under pressure over land using a freight vehicle. Embodiments according to the present invention may, without being restricted hereto, comprise the movable cryogenic storage tank.

Said power plant 1 comprises a housing 4 in the form of a container that is suitable for transporting the power plant integrally as a transport unit. The container can be an intermodal freight container of a standard size, such as an ISO container, for example a standard 20 ft container, 30 ft container or 40 ft container. More particularly, said housing 4 may be adapted for loading onto a standard freight vehicle.

FIG. 2 shows an exemplary implementation of a power plant 1 according to embodiments of the present invention. The aggregate 3 and the evaporation unit 7 may be installed within the housing. For example, substantially all components of the power plant 1 may be installed within the housing. The housing may comprise a metal frame to form a beam-shaped housing. The sides of said beam-shaped housing may be partly closed, for example by plates and/or grids. Preferably the bottom and/or the lateral sides are partly open in order to suck air from the environment. Preferably the top and/or the lateral sides are partly open in order to be able to discharge residual heat in the form of hot air and/or to discharge combustion gases.

It is an advantage of embodiments according to the present invention that a power plant can be installed at a site without requiring assembly, for example by only making simple connections to the power plant, which in ready-to-use state can be supplied using a freight vehicle. For example, one or more gas distribution circuits can connect the ready-to-start power plant to the movable cryogenic storage tank and one or more current connections can connect the ready-to-start power plant to one or more electrical power consumers. Optionally, one or more heating circuits and/or cooling circuits can be connected to the ready-to-start power plant. For example, the power plant, having a rated power of, for example, 1 MW, can be installed in a limited time, for example in three hour or less.

It is an advantage of embodiments of the present invention that a power plant can be easily maintained and repaired, with restricted duration of an interruption of the energy supply, for example by replacing the power plant with a substantially identical power plant, while the power plant to be repaired or serviced is removed to a maintenance centre. It is a further advantage that several identical power plants can be simply installed in parallel, for example to increase a power supplied in a straightforward manner depending on an evolving energy requirement and/or to provide redundancy in the energy supply.

A power plant according to embodiments of the present invention may comprise an access security, for example a mechanical security, such as a mechanical lock, and/or an electronic security, such as a monitoring system. The power plant may comprise an alarm system to report unauthorised access, for example physical and/or virtual access, to the power plant, for example using an electronic alarm signal, a visual alarm signal and/or an auditive alarm signal. The alarm system may comprise an emergency stop system to switch the power plant off upon detected unauthorised access.

In a power plant according to embodiments of the present invention, the housing may comprise a self-lifting device to hoist the housing autonomously off and/or onto a freight vehicle. The self-lifting device can form an integral part of the housing.

The self-lifting device can, for example, comprise a plurality of folding and/or extendable support elements to the support housing above the ground. The support elements may comprise lifting jack elements to jack the housing up and down. The support elements can be manually driven and/or be driven by the power plant, for example by the motor, the generator and/or a battery of the power plant.

The power plant 1 comprises a gas inlet 5, installed in or on the housing, to receive the liquid gas product via a line 6 connected to the removable cryogenic storage tank 2. Preferably the gas inlet 5 may be adapted to receive the liquid gas product at an overpressure, for example an overpressure in the range of 1.0 barg to 3 barg. The gas inlet may comprise a regulating valve to regulate the pressure of the incoming liquid gas product. The cryogenic storage tank may be adapted to store the liquid gas product under the slightly increased pressure, or may comprise at least one regulating valve to regulate the pressure of the liquid gas product at an output coupling in a suitable pressure range. It is an advantage that, by providing a slight overpressure, the power plant can be passively supplied with the gas product, and thus need not comprise active transport means such as pumps. It is an advantage of such a passive gas supply that, upon start-up of the power plant, only limited power is required to initiate the energy production.

The power plant comprises an evaporation unit 7 for converting the liquid gas product to a gaseous phase.

The power plant comprises an aggregate 3, provided in the housing, comprising a motor 11 for the combustion of the gaseous phase and an electrical generator 12 coupled to the motor such that the electrical generator can be driven by the motor.

In embodiments according to the present invention, the aggregate 3 may be adapted for supplying electrical power in the range of 250 kW to 5 MW, such as, preferably, in the range of 500 kW to 2 MW.

The power plant may comprise a cooling circuit 10 to withdraw heat, in operation, from the motor. The cooling circuit may comprise a suitable cooling fluid, such as water.

In embodiments according to the present invention, the power plant can also be adapted to provide heat via a heating circuit, such as a hot water circuit or a steam circuit. In embodiments according to the present invention, the power plant can also be adapted to provide cooling via a cooling circuit. For example, the power plant may comprise a coupling to connect an external heating and/or cooling circuit to the power plant. For example, said cooling circuit 10, or another cooling circuit that also withdraws heat from the motor and/or an outlet of the motor, may be adapted to transfer heat to the external heating circuit. For example, said evaporation unit 7 may comprise a heat exchanger to cool a cooling medium in the external cooling circuit by heat transfer from this cooling medium to the liquid gas product.

Said evaporation unit 7 may comprise a heat exchanger to transfer heat from said cooling circuit 10 to the liquid gas product to evaporate the liquid gas product.

The power plant comprises a line circuit 9 to bring the liquid gas product and/or the gaseous phase of the gas inlet to the motor via the evaporation unit. For example, in operation, the line circuit can transport the liquid gas product in substantially liquid phase from the gas inlet to the evaporation unit and transport it in substantially gaseous phase from the evaporation unit to the motor. Preferably the line circuit 9 does not comprise active transport means, such as pumps.

In embodiments according to the present invention, the power plant can also comprise a connection for a gas distribution network to serve as alternative gas source for the liquid gas product in the movable cryogenic storage tank. For example, the power plant may comprise a gas distribution network coupling to receive the gas product directly in gaseous phase. For example, this gas distribution network coupling may be connected to said line circuit 9 between the evaporation unit 7 and the motor 11.

The power plant comprises a current output 8 to supply an electrical current generated by the electrical generator 12 to an external power consumer.

In embodiments according to the present invention, the power plant may be adapted to serve as an emergency power supply, for example to ensure a continuous power supply upon a disruption of a power supply via a power distribution network.

In embodiments according to the present invention, the power plant may be adapted to supply an electrical current outside the net ('off-grid'), for example to ensure a power supply without requiring a connection to a power distribution network.

In embodiments according to the present invention, the power plant may be adapted to be switched in a hybrid energy network, for example in combination with a photovoltaic system and/or wind energy plant.

The power plant further comprises a regulating or regulation unit 15. Said regulating unit is adapted to regulate the pressure and/or temperature in the line circuit using at least one valve in said line circuit 9, such that the pressure of the gaseous phase supplied to the motor is regulated in a predetermined range and the temperature of the gaseous phase amounts to at least 5° C. Preferably said regulating unit can regulate the temperature of the gaseous phase such that this amounts to at least 10° C. when supplied to the motor. Said regulating unit can regulate the temperature of the gaseous phase such that this amounts to a maximum of, for example, 50° C. The predetermined range can, for example, comprise a range of 10 to 1000 mbar, preferably a range of 20 mbar to 200 mbar, preferably a range of 25 mbar to 100 mbar.

The regulating unit can further be adapted to regulate the temperature of the cooling fluid in said cooling circuit 10, e.g. water in the water circuit, such that this temperature lies in the range from 35° C. to 60° C., for example, preferably lying in the range of 40° C. to 50° C., for example such that this temperature is approximately 45° C., before the heat transfer to the liquid gas product in the evaporation unit. By controlling the cooling fluid (e.g. water) temperature to a low temperature, for example approximately 45° C., the temperature of the gaseous phase can be easily controlled within a suitable range for use by the motor. The line circuit 9 thus does not require complex means to regulate the pressure and temperature of the gas.

The regulating unit may comprise passive control mechanisms, such as mechanical control valves. Said control device may also comprise active control mechanisms, such as a processing unit, sensors, such as pressure and/or temperature sensors, and/or electrically driven valves.

For example, the regulating unit may comprise a pressure regulator DR. When no gas is taken off by the motor, the pressure in the line circuit up to the closed pressure regulator DR can increase until this is substantially equal to the tank pressure as supplied to the entrance of said gas inlet 5. The excess gas or pressure can thus be forced back into the tank. When the motor takes off gas, the pressure decreases and liquid gas product can be forced into the system again, dependent on the pressure difference and thus also directly dependent on the consumption. A higher consumption causes a large pressure difference and thus a faster supply. Such a passive open system has the advantage that ventilating excess production of gas in gaseous phase from the liquid gas product can be avoided.

Figure 3:
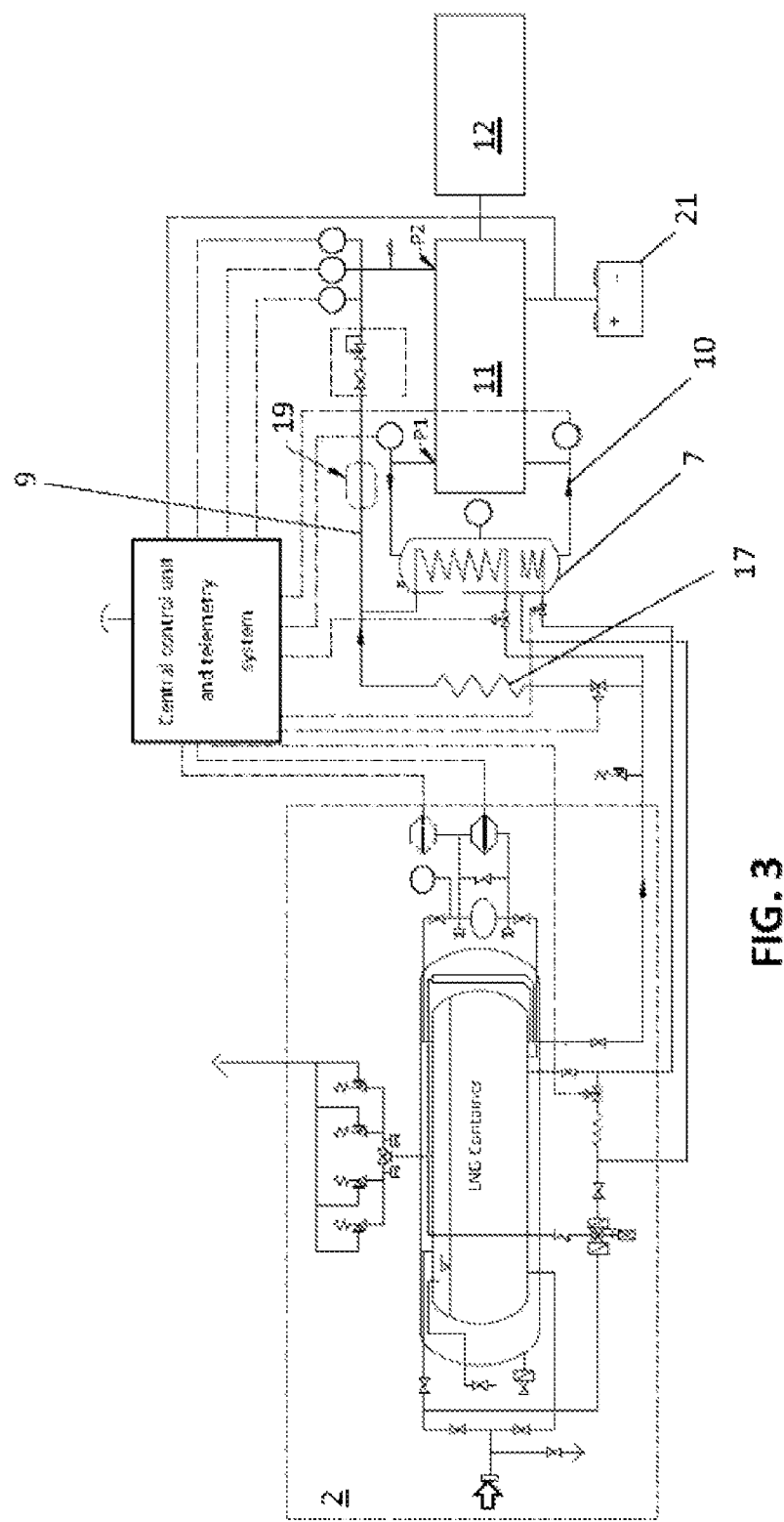
FIG. 3 shows an exemplary diagram of a power plant according to embodiments of the present invention.

FIG. 3 shows a schematical flow chart of a power plant 1 corresponding to embodiments of the present invention. Said evaporation unit 7 withdraws heat from the cooling circuit 10 to evaporate the liquid gas product in said line circuit 9. In addition, the evaporation unit 7 can also comprise an ambient heat exchanger 17 to evaporate the liquid gas product by exposure to an ambient temperature, for example by heat exchange with the ambient air. This ambient heat exchanger 17 can be installed parallel to a primary heat exchanger to evaporate the liquid gas product using heat withdrawn from said cooling circuit 10. It is an advantage that in a start-up phase of the power plant, where the motor has not yet reached its operating temperature and/or is not yet started up, for example upon an insufficient pressure of the gaseous phase in said line circuit 9, the ambient heat exchanger 17 can evaporate the liquid gas product passively until a sufficient pressure and temperature of the gaseous phase in said line circuit 9 is built up to start the motor. After the motor has warmed up, the primary heat exchanger can substantially take over the evaporation process, so that a sufficient supply rate can be achieved.

Said power plant 1 may comprise a buffer tank 19 coupled to said line circuit 9. It is an advantage of such a buffer tank 19 that a reserve of the gaseous phase can be stored to accommodate variations in the delivered power and/or to build up a reserve of the gaseous phase, for example by evaporation using the ambient heat exchanger 17, for example such that this reserve is sufficient to start the motor and to allow it to reach its operating temperature.

The power plant 1 may comprise a battery 21, for example to provide a continuous power supply to a control device of the power plant, for example upon the start-up of the power plant. The control device can, for example, comprise a processing unit for processing signals of sensors, for driving actuators, such as control valves, and/or for driving the aggregate. The control device can also be connected to said cryogenic storage tank 2, for example to control the temperature and pressure of the stored liquid gas product.

In a power plant according to embodiments of the present invention, the electronic control device may comprise a communication module to monitor and/or control the power plant via a communication connection, such as a digital communication network and/or a radio signal.

In a second aspect, the present invention relates to a method for energy production from a liquid gas product stored in a movable cryogenic storage tank. The method comprises supplying the power plant according to embodiments of the first aspect of the present invention to a site by integrally transporting the power plant as a transport unit to the site. The method comprises supplying a movable cryogenic storage tank filled with the liquid gas product to the site. The method comprises connecting the movable cryogenic storage tank using a line to the gas inlet of the power plant. The method comprises evaporating, in the evaporation unit, the liquid gas product that is forced into the evaporation unit by an overpressure in the cryogenic storage tank via the gas inlet and the line circuit, such that a gaseous phase of the liquid gas product is formed by evaporation. The method comprises the combustion of the gaseous phase to drive the motor of the power plant, and the generation of an electrical current by the electrical generator coupled to the motor. The method comprises supplying the electrical current via the current output of the power plant to an external power consumer.

The pressure and/or temperature in the line circuit can be regulated in a predetermined range such that the temperature of the gaseous phase amounts to at least 5° C. The liquid gas product in the gaseous phase is here supplied to the motor by passive liquid and gas transport of the liquid gas product and the gaseous phase.

Figure 4:
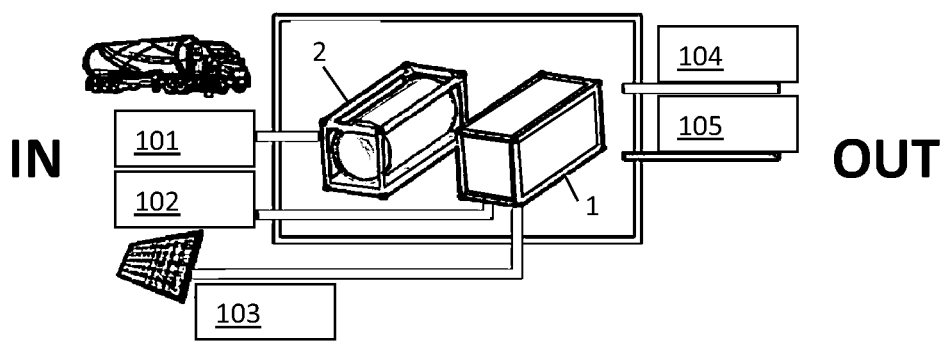
FIG. 4 illustrates essential and/or optional characteristics of a method according to embodiments of the present invention.

The method may also comprise the withdrawal of heat from the motor by a cooling circuit, and may comprise the transmission of heat from the cooling circuit to the liquid gas product to evaporate the liquid gas product in the evaporation unit, FIG. 4 shows a conceptual representation of a method according to embodiments of the present invention.

The method may comprise, additionally to the supply 101 of the movable cryogenic storage tank 2 filled with the liquid gas product to the site, the supply 102 of a gaseous gas product under pressure via a gas distribution network.

The method may also comprise the connection 103 of the power plant to a photovoltaic system and/or a wind power station.

The method comprises the supply 104 of the electrical current via the current output of the power plant to an external power consumer.

In addition, the method may comprise the supply 105 of heat and/or cooling, the supply 105 comprising, e.g., an external heating circuit and/or an external cooling circuit.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is connected.

The invention claimed is:

1. A system for energy production from a liquid gas product, the system comprising:
    a cryogenic storage tank including an LNG container for storing the liquid gas product; and
    a power plant, the power plant comprising:
        a housing comprising an ISO intermodal freight container configured for loading onto a standard freight vehicle;
        a fuel inlet, provided in or on the housing, to receive the liquid gas product via a line connected to the cryogenic storage tank;
        an evaporation unit, provided in or on the housing, for converting the liquid gas product to a gaseous phase;
        an aggregate, provided in the housing, comprising a motor for combustion of the gaseous phase and an electrical generator coupled to the motor such that the electrical generator can be driven by the motor;
        a line circuit to bring the liquid gas product and/or the gaseous phase from the fuel inlet to the motor via the evaporation unit;
        a current output to supply an electrical current generated by the electrical generator to a power consumer;
        a cooling circuit to, in operation, withdraw heat from the motor, where the evaporation unit comprises a heat exchanger to transfer the heat from the motor in the cooling circuit to the liquid gas product to evaporate the liquid gas product;
        wherein the evaporation unit comprises an ambient heat exchanger provided parallel to the heat exchanger; and
        a regulating unit,
        wherein the regulating unit is adapted to regulate a pressure and temperature in the line circuit using at least one valve in the line circuit, such that the pressure of the gaseous phase supplied to the motor is regulated in a predetermined range and such that the temperature of the gaseous phase supplied to the motor amounts to at least 5° C.,
        wherein the regulating unit comprises a passive flow control device to control or influence a flow rate of the liquid gas product to regulate a supply of the liquid gas product, solely driven by the liquid gas product being forced into the evaporation unit via the fuel inlet and the line circuit by an overpressure in the cryogenic storage tank, to the motor in the gaseous phase by passive liquid and gas transport of the liquid gas product and the gaseous phase;
    wherein the cryogenic storage tank is independently movable from the power plant.

2. The system according to claim 1, wherein the regulating unit is adapted to regulate a temperature of a cooling fluid in the cooling circuit such that said temperature lies in a range of 40° C. to 50° C. before the heat transfer to the liquid gas product in the evaporation unit.

3. The system according to claim 1, wherein the liquid gas product comprises liquefied natural gas.

4. The system according to claim 1, wherein the fuel inlet is adapted to receive the liquid gas product at the overpressure of at least 1.0 barg.

5. The system according to claim 1, wherein the aggregate is adapted to supply an electrical power in a range of 250 kW to 5 MW.

6. The system according to claim 1, further comprising a coupling to connect an external heating circuit and/or an external cooling circuit to the power plant, wherein either the cooling circuit is adapted to transfer the heat to the external heating circuit or wherein the evaporation unit comprises a further heat exchanger to cool a cooling medium in the external cooling circuit by heat transfer from the cooling medium to the liquid gas product, or a combination thereof.

7. The system according to claim 1, comprising a connection to couple a gas distribution network to the line circuit as alternative gas source.

8. The system according to claim 1, wherein the regulating unit regulates the temperature of the gaseous phase such that the temperature at least amounts to 10° C. when supplied to the motor, and wherein the regulating unit regulates the temperature of the gaseous phase such that the temperature amounts to a maximum of 50° C.

9. The system according to claim 1, further comprising a buffer tank coupled to the line circuit.

10. The system according to claim 1, further comprising an electronic control device for processing signals of sensors, for driving actuators and/or for driving the aggregate.

11. A method for energy production from the system of claim 1, the method comprising:
    providing the power plant to a site by transporting the ISO intermodal freight container to the site;
    providing the cryogenic storage tank filled with the liquid gas product to the site by transporting the LNG container to the site;
    connecting the cryogenic storage tank to the fuel inlet of the power plant with the line;
    evaporating, in the evaporation unit, the liquid gas product that, by the overpressure in the cryogenic storage tank, is forced into the evaporation unit via the fuel inlet and the line circuit, such that the gaseous phase of the liquid gas product is formed;
    burning the gaseous phase to drive the motor;
    generating an electrical current by the electrical generator coupled to the motor, and supplying the electrical current via the current output to an external power consumer, wherein the pressure and temperature in the line circuit is regulated in the predetermined range such that the temperature of the gaseous phase amounts to at least 5° C., wherein the liquid gas product in the gaseous phase is supplied to the motor.

12. The system according to claim 10, the electronic control device further comprising a battery to provide a power supply to the electronic control device of the power plant when the aggregate does not supply electrical power.

* * * * *